(12) United States Patent
Eschborn et al.

(10) Patent No.: US 8,191,860 B2
(45) Date of Patent: Jun. 5, 2012

(54) LOW PROFILE VALVE ACTUATOR HAVING HIGH TORQUE OUTPUT

(75) Inventors: David M. Eschborn, Gilbert, AZ (US); Glenn H. Lane, Chandler, AZ (US); Louie T. Gaines, Phoenix, AZ (US); Todd Langston, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 968 days.

(21) Appl. No.: 12/183,886

(22) Filed: Jul. 31, 2008

(65) Prior Publication Data
US 2010/0025610 A1 Feb. 4, 2010

(51) Int. Cl.
*F16K 31/44* (2006.01)
(52) U.S. Cl. ............ 251/250; 251/31; 251/129.11; 251/264
(58) Field of Classification Search ......... 251/31, 251/129.11, 248, 250, 264, 266; 475/332; 74/89–89.28
See application file for complete search history.

(56) References Cited

U.S. PATENT DOCUMENTS

| | | | | |
|---|---|---|---|---|
| 3,056,573 A * | 10/1962 | Matheson et al. | ............ | 251/31 |
| 3,113,473 A * | 12/1963 | Morlen | ............ | 475/155 |
| 3,338,140 A * | 8/1967 | Sheesley | ............ | 92/5 R |
| 4,586,392 A * | 5/1986 | Nilsson | ............ | 74/89.42 |
| 4,749,004 A * | 6/1988 | Peash | ............ | 137/865 |
| 4,890,645 A * | 1/1990 | Andersen | ............ | 137/625.66 |
| 4,955,245 A * | 9/1990 | Janssen et al. | ............ | 74/109 |
| 5,050,638 A * | 9/1991 | Zeller et al. | ............ | 137/553 |
| 5,166,677 A | 11/1992 | Schoenberg | | |
| 5,325,888 A * | 7/1994 | Stary | ............ | 137/553 |
| 5,427,132 A * | 6/1995 | Fenner, Jr. | ............ | 137/79 |
| 5,676,171 A * | 10/1997 | Heed | ............ | 137/318 |
| 6,070,513 A * | 6/2000 | MacDonald | ............ | 91/176 |
| 7,273,067 B2 | 9/2007 | Quitmeyer et al. | | |
| 7,377,479 B1* | 5/2008 | Chen | ............ | 251/69 |
| 7,681,864 B2* | 3/2010 | O'Shea | ............ | 251/288 |
| 2002/0011580 A1 | 1/2002 | Johansen et al. | | |

FOREIGN PATENT DOCUMENTS

GB 2198766 6/1988
WO 2005068883 A1 7/2005

* cited by examiner

*Primary Examiner* — John Fristoe, Jr.
*Assistant Examiner* — Jessica Cahill
(74) *Attorney, Agent, or Firm* — Ingrassia Fisher & Lorenz, P.C.

(57) ABSTRACT

A valve actuator is provided for use in conjunction with a drive motor and a valve. In one embodiment, the valve actuator includes a housing assembly, a first power screw rotatably mounted in the housing assembly and configured to be rotated by the drive motor, a first rack translatably mounted in the housing assembly, and a pinion rotatably mounted in the housing assembly and mechanically linked to the valve. The first rack is threadably coupled to the first power screw and is configured to move linearly as the first power screw rotates. The pinion engages the first rack and is configured to rotate as the first rack moves linearly to move the valve to a desired position.

13 Claims, 5 Drawing Sheets

LOW PROFILE VALVE ACTUATOR HAVING HIGH TORQUE OUTPUT

TECHNICAL FIELD

The present invention relates generally to valve actuators and, more particularly, to a low profile valve actuator capable of producing a relatively high torque output.

BACKGROUND

Valve actuators are utilized in a wide variety of hydraulic and pneumatic systems to adjust the position of a valve element within a flow passage and thereby regulate fluid flow therethrough. When deployed on a vehicle, it is often desirable for a valve actuator to provide a relatively high torque output while simultaneously having a compact and lightweight package. When deployed on a submarine, in particular, it is further desirable that such a valve actuator operates in an exceptionally quiet and reliable manner. High power hydraulic actuators are routinely employed to achieve these goals. However, high power hydraulic actuators typically require fluid connection to a remote hydraulic source via a plumbing network. Not only do such plumbing networks pose potential fluid leakage problems, but they add undesirable cost, weight, and volume to the overall system.

Accordingly, it is desirable to provide a low profile valve actuator that provides a relatively high torque output. Preferably, such a low profile valve actuator would be mechanically balanced so as to reduce component stress and thereby improve reliability and operational life. It would also be desirable if, in certain embodiments, the valve actuator were electromechanical and thus did not require plumbing of the type commonly associated with conventional high power hydraulic actuators. Finally, in embodiments intended for deployment aboard a submarine, it would be desirable for such a low profile valve actuator to operate in a quiet manner. Other desirable features and characteristics of the present invention will become apparent from the subsequent Detailed Description and the appended claims, taken in conjunction with the accompanying drawings and this Background.

BRIEF SUMMARY

A valve actuator is provided for use in conjunction with a drive motor and a valve. In one embodiment, the valve actuator includes a housing assembly, a first power screw rotatably mounted in the housing assembly and configured to be rotated by the drive motor, a first rack translatably mounted in the housing assembly, and a pinion rotatably mounted in the housing assembly and mechanically linked to the valve. The first rack is threadably coupled to the first power screw and is configured to move linearly as the first power screw rotates. The pinion engages the first rack and is configured to rotate as the first rack moves linearly to move the valve to a desired position.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
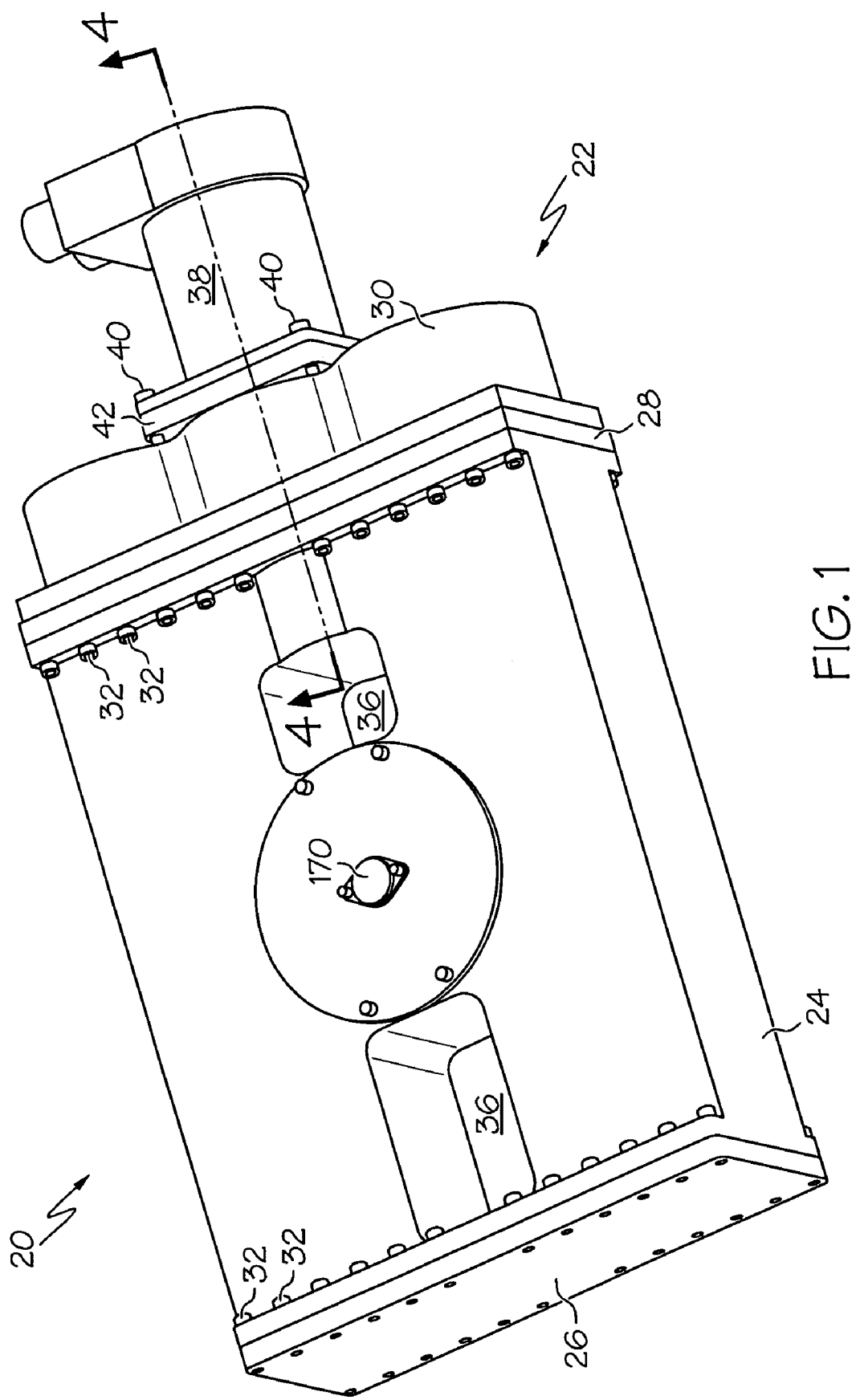
FIGS. 1 and 2 are side isometric and end plan views, respectively, of a low profile valve actuator in accordance with an exemplary embodiment.
Figure 2:
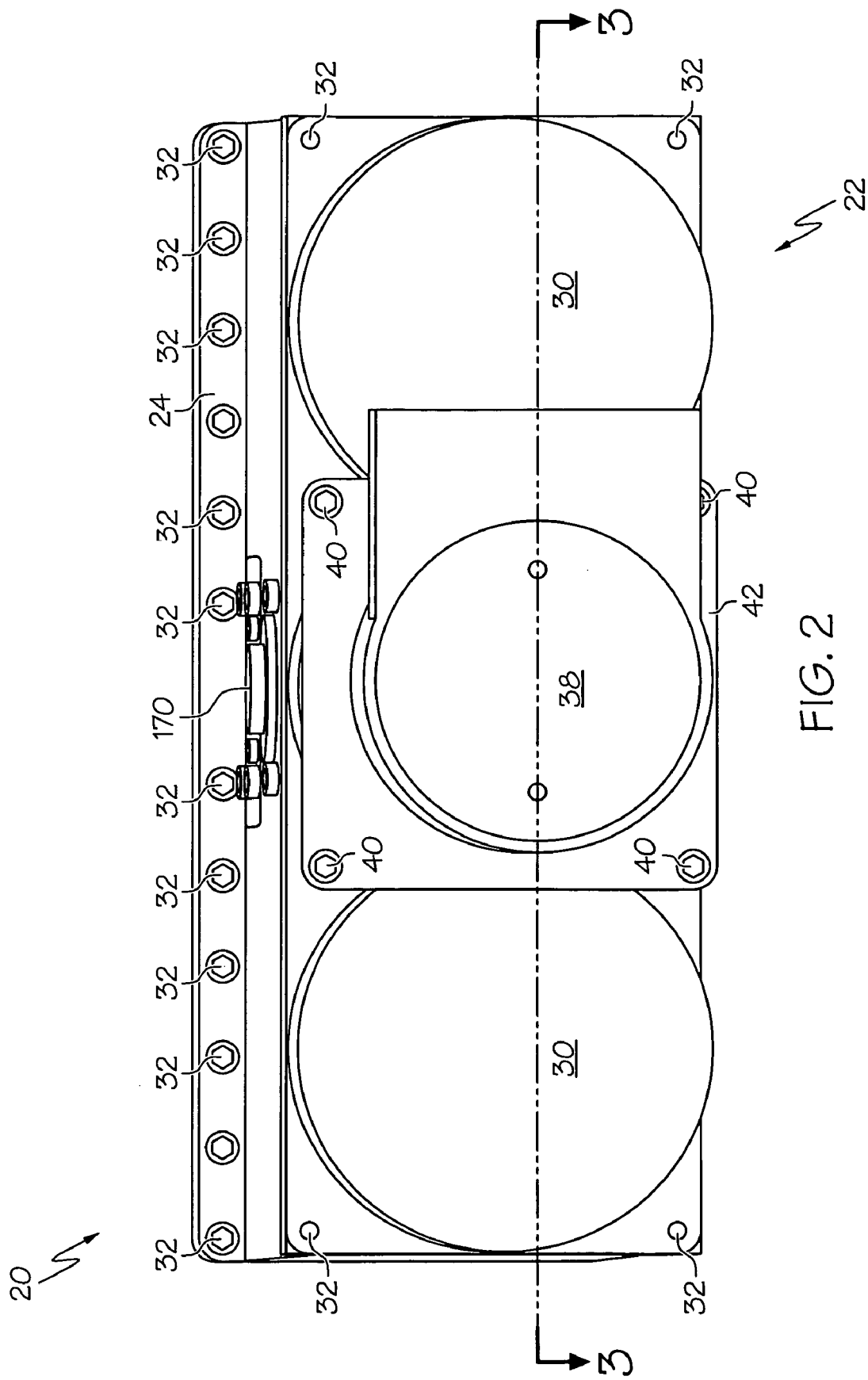

FIGS. 1 and 2 are side isometric and end plan views, respectively, of a low profile valve actuator 20 in accordance with an exemplary embodiment of the present invention. Valve actuator 20 is characterized by a lightweight and low profile envelope, which may be generally described as having a "pancake-like geometry" due to its low width-to-height and width-to-length aspect ratios. Despite its streamlined package, valve actuator 20 is capable of producing a relatively high torque output and is consequently well-suited for use in a wide variety of applications. In the exemplary embodiment shown in FIGS. 1 and 2 and described below, valve actuator 20 is also capable of operating in an extremely quiet and reliable manner and is consequently especially well-suited for use aboard a submarine.

Referring collectively to FIGS. 1 and 2, valve actuator 20 comprises an actuator housing assembly 22. Actuator housing assembly 22 may include one or more individual housing components suitable for containing or otherwise supporting the various components of valve actuator 20. In the illustrated exemplary embodiment, housing assembly 22 includes four main components: (i) a main housing 24, (ii) a first end plate 26, (iii) a second end plate 28, and (iv) a gear housing 30. First end plate 26 and second end plate 28 are fixedly coupled to opposing ends of main housing 24 utilizing, for example, a plurality of bolts 32 or other such fasteners. Certain ones of bolts 32 may also extend through second end plate 28 and into gear housing 30 to fixedly mount gear housing 30 to end plate 28 substantially opposite main housing 24. If desired, and as shown in FIG. 1, main housing 24 may include one or more apertures 36 therethrough for weight reduction.

A drive motor 38 is mounted to actuator housing assembly 22. More specifically, drive motor 38 is fixedly attached (e.g., utilizing bolts 40) to a mounting flange 42 provided on gear housing 30. Drive motor 38 may assume the form of a hydraulic or pneumatic device. However, drive motor 38 preferably assumes and the form of an electric motor, such as a brushless direct current (DC) motor, an alternating current (AC) induction motor, or a stepper motor. Electric motors are generally preferred as they may be driven by a local power source and do not require the plumbing associated with fluid-driven motors. In addition, electric motors facilitate the performance of diagnostic tests (e.g., monitoring of motor speed, current draw, etc.) and may be readily reconfigured to accommodate disparate operating conditions. Regardless of its particular form, drive motor 38 is preferably capable of operating at relatively high output speeds so as to enable valve actuator 20 to achieve a high torque output as described in more detail below.

Figure 3:
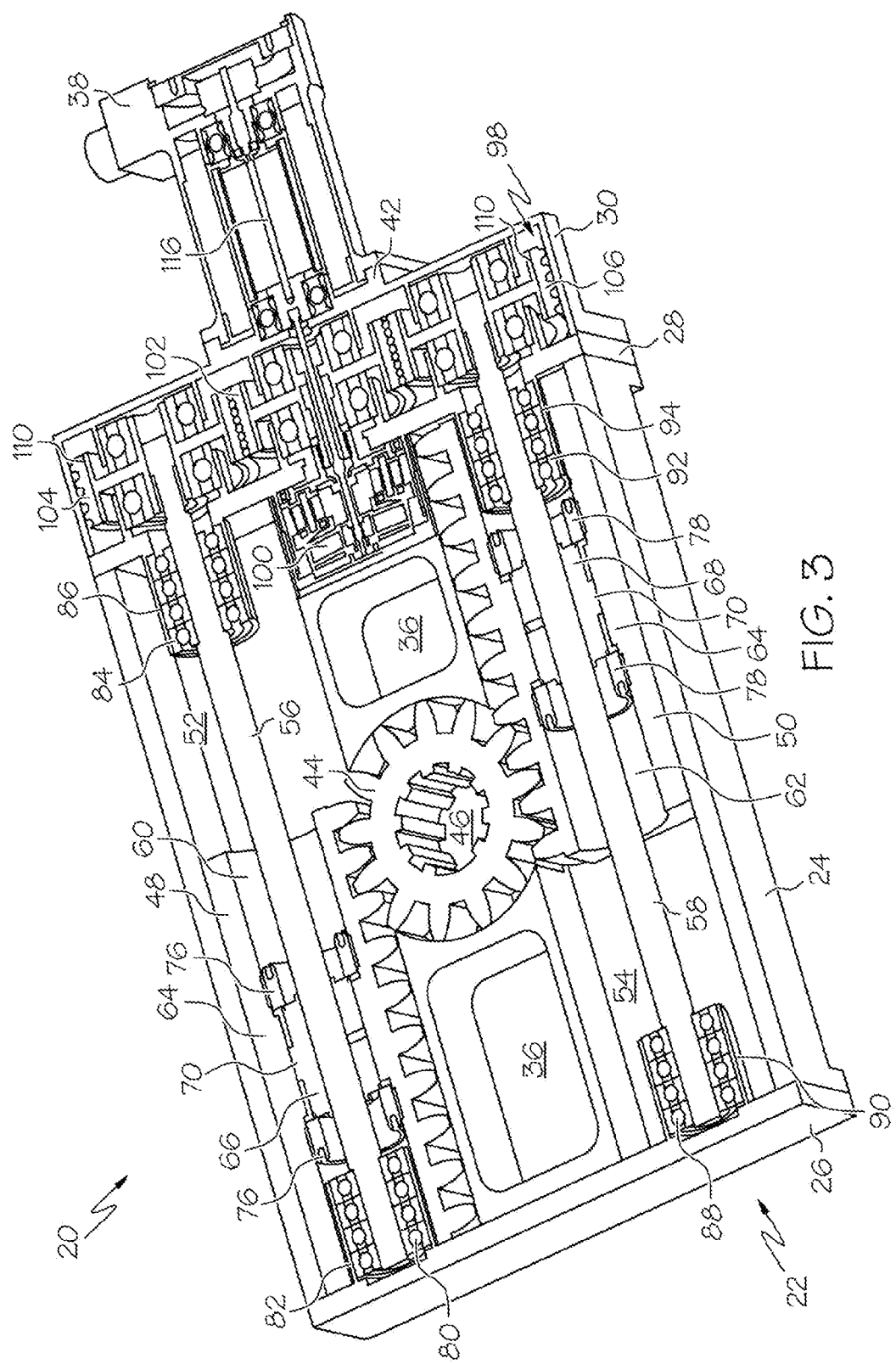
FIG. 3 is a cross-sectional isometric view of the valve actuator shown in FIGS. 1 and 2 taken along line 3-3 (labeled in FIG. 2)

FIG. 3 is a cross-sectional isometric view of valve actuator 20 taken along line 3-3 (labeled in FIG. 2). In this view, it can be seen that a first rack 48 and a second rack 50 are translatably disposed within main housing 24. In particular, first rack 48 resides within a first elongated cavity 52 provided within main housing 24, and second rack 50 resides within a second elongated cavity 54 provided within main housing 24. To accommodate the translational movement of racks 48 and 50, the lengths of elongated cavities 52 and 54 are appreciably greater than the lengths of racks 48 and 50, respectively. To prevent the rotational movement of racks 48 and 50 within cavities 52 and 54, racks 48 and 50 may be keyed. Alternatively, and as indicated in FIG. 3, racks 48 and 50 and elongated cavities 52 and 54 may have corresponding polygonal (e.g., rectangular) cross-sectional geometries.

A pinion 44 is rotatably mounted in a central portion of main housing 24. Pinion 44 is disposed between racks 48 and 50 such that opposing circumferential portions of pinion 44 are engaged by the inner toothed surfaces of racks 48 and 50. As will be described more fully below, racks 48 and 50 are mechanically linked such that, as rack 48 moves in a first linear direction, rack 50 moves in a second, opposing linear direction. As racks 48 and 50 move in this manner, pinion 44 rotates accordingly. For example, and beginning from the position illustrated in FIG. 3, as rack 48 moves to the right, rack 50 moves to the left and pinion 44 rotates clockwise. By situating pinion 44 between opposing racks 48 and 50 in this manner, a mechanical balancing is achieved that reduces component stress (e.g., the mechanical stresses experienced by bearings 80, 84, 88, and 92 described below), that promotes even tooth wear, and that generally improves the reliability and operational life of valve actuator 20.

Pinion 44 serves as the mechanical output of valve actuator 20; i.e., pinion 44 is configured to be mechanically coupled to one or more valve elements (not shown) movably disposed within a flow passage (also not shown). Pinion 44 may be coupled to a valve element in any suitable manner. In the illustrated example, pinion 44 has a splined central opening 46 formed therethrough that may matingly receive the splined end of a rotatable shaft that is, in turn, coupled to a valve element, such as butterfly plate 152 described below in conjunction with FIG. 5. The rotational range of pinion 44 is generally determined by the characteristics (e.g., linear range and length) of racks 48 and 50. In the illustrated exemplary embodiment, valve actuator 20 may rotate pinion 44 over a rotational range of approximately 180 degrees. However, in alternative embodiments, the length of racks 48 and 50 and the linear range of racks 48 and 50 (as determined by, for example, the dimensions of cavities 52 and 54) may be such that valve actuator 20 may cause pinion 44 to rotate one or more complete revolutions.

A first power screw 56 is rotatably mounted within first elongated cavity 52 and threadably coupled to rack 48, and a second power screw 58 is rotatably mounted within elongated cavity 54 threadably coupled to rack 50. As appearing herein, the term "power screw" is defined broadly as a threaded shaft, or a device including such a threaded shaft, suitable for converting rotary motion into linear motion. Power screws include, but are not limited to, acme screws, lead screws, and rolling element screws (e.g., recirculating ball screws, roller screws, etc.). Power screw 56 may be threadably coupled, either directly or indirectly, to any portion of rack 48; and power screw 58 may be threadably coupled, either directly or indirectly, to any portion of rack 50. In the illustrated exemplary embodiment, power screws 56 and 58 are threadably coupled to inner portions of racks 48 and 50, respectively. More specifically, power screw 56 extends through a first longitudinal channel 60 provided through rack 48, and power screw 58 extends through a second longitudinal channel 62 formed through rack 50. A first nut 66 is mounted within a constricted portion 64 of longitudinal channel 60 and threadably couples power screw 56 to the inner surface of rack 48. Similarly, a second nut 68 is mounted within a constricted portion 64 of longitudinal channel 62 and threadably couples power screw 58 to the inner surface of rack 50. Notably, by threadably coupling power screws 56 and 58 to the inner surfaces of racks 48 and 50 in this manner (i.e., by embedding the threaded interface within racks 48 and 50), a significant savings in the volume and weight of valve actuator 20 may be achieved.

Referring still to the exemplary embodiment shown in FIG. 3, first nut 66 is mounted within longitudinal channel 60 such that nut 66 cannot rotate independently of rack 48, and second nut 68 is mounted within longitudinal channel 62 such that nut 68 cannot rotate independently of rack 50. To this end, nuts 66 and 68 may be fixedly coupled to interior of racks 48 and 50 by welding, soldering, or other such means. However, in the illustrated embodiment, nuts 66 and 68 are keyed with the internal surface of racks 48 and 50; e.g., nuts 66 and 68 may each include a keyed ridge that is received within a longitudinal keyway formed within racks 48 and 50, respectively, as indicated in FIG. 3 at 70. Two adjustment collars 76 are threadably coupled to opposing ends of nut 66 and abut the sidewalls of constricted portion 64. Two adjustment collars 78 are likewise threadably coupled to opposing ends of nut 68 and abut the sidewalls of constricted portion 64. Adjustment collars 76 and 78 permit the linear positions of nuts 66 and 68, respectively, to be adjusted within racks 48 and 50. A technician may rotate adjustment collars 76 and/or adjustment collars 78 as needed to synchronize the movement of rack 48 with rack 50 and thereby ensure a balanced force transmission from racks 48 and 50 to pinion 44. The foregoing example notwithstanding, in alternative embodiments, racks 48 and 50 may be machined to include an internal threading and may directly engage power screws 56 and 58 thereby eliminating the need for nuts 66 and 68 or other such intermediary threaded bodies.

The rotation of power screws 56 and 58 results in the linear movement of nuts 66 and 68 and, therefore, the respective linear movement of racks 48 and 50. To facilitate the rotation of power screws 56 and 58, one or more bearings (e.g., rolling element bearings, fluid bearings, bushings, etc.) may be disposed between power screw 56 and/or power screw 58 and various internal structures of actuator housing assembly 22. In the exemplary embodiment illustrated in FIG. 3, specifically, a quadplex ball bearing 80 is disposed between an end portion of power screw 56 and an annular flange 82 extending from end plate 26 into elongated cavity 52, and a quadplex ball bearing 84 is disposed between an end opposing portion of power screw 56 and an annular flange 86 extending from end plate 28 into elongated cavity 52. Similarly, a quadplex bearing 88 is disposed between an end portion of power screw 58 and an annular flange 90 extending from end plate 26 into elongated cavity 54, and a quadplex ball bearing 92 is disposed between an end opposing portion of power screw 58 and an annular flange 94 extending from end plate 28 into elongated cavity 54. Notably, bearings 80, 84, 88, and 92 and flanges 82, 86, 90, and 94 are dimensioned and positioned so as to be received within longitudinal channels 60 and 62 at certain translational positions of racks 48 and 50, which permits the dimensions of valve actuator 20 to be further reduced.

Drive motor 38 is mechanically coupled to power screws 56 and 58 by way of a motor-to-screw drive train 98. Motorto-screw drive train 98 may comprise any combination of mechanical components (e.g., belts, linkages, gears, splines, friction rollers, etc.) suitable for permitting drive motor 38 to impart simultaneously rotational movement to power screws 56 and 58. Valve actuator 20 is configured such that, when power screws 56 and 58 are rotated by drive motor 38, racks 48 and 50 move: (i) in substantially opposite linear directions, and (ii) in substantially equivalent increments. In the illustrated exemplary embodiment, drive motor 38 and motor-to-screw drive train 98 cooperate to cause power screws 56 and 58 to rotate in the same rotational direction; i.e., screws 56 and 58 simultaneously rotate in either the clockwise or the counterclockwise direction. Thus, to achieve opposing linear motion of racks 48 and 50, power screws 56 and 58 are selected to have opposing threads (e.g., power screw 56 may have a left hand thread, and power screw 58 may have a right hand thread). In alternative embodiments wherein drive motor 38 and motor-to-screw drive train 98 cooperate to rotate power screws 56 and 58 in substantially opposite rotational directions, opposing linear motion of racks 48 and 50 may be achieved by providing power screws 56 and 58 with identical or similar threads (e.g., power screws 56 and 58 may each have a left hand thread).

By way of example only, motor-to-screw drive train 98 is illustrated in FIG. 3 as including the following components: (i) a dual stage traction drive 100, (ii) a central drive gear 102, (iii) a first peripheral drive gear 104, and (iv) a second peripheral drive gear 106. Traction drive 100 mechanically couples drive motor 38 to central drive gear 102, which is disposed between and engages peripheral drive gears 104 and 106. Peripheral drive gears 104 and 106 are, in turn, fixedly coupled to power screws 56 and 58, respectively; e.g., as shown in FIG. 3, a splined end portion of each power screw may be received within a splined opening provided through the center hub of each drive gear. Thus, when drive gear 102 rotates in a first rotational direction, peripheral drive gears 104 and 106 each rotate in a second, opposite rotational direction. This, in turn, causes power screws 56 and 58 to rotate in the same direction and thereby impart opposing linear motion to racks 48 and 50, respectively, in the above described manner.

Figure 4:
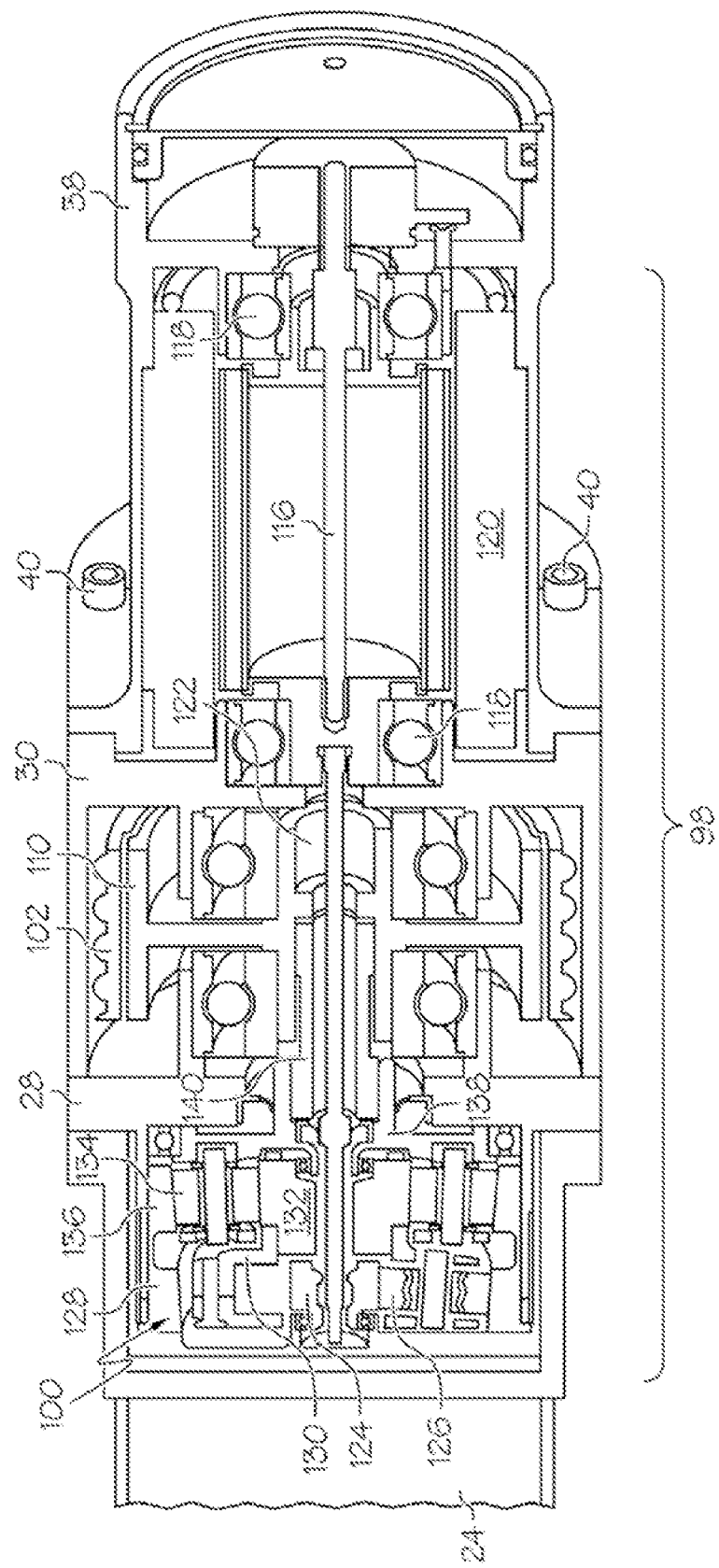
FIG. 4 is a cross-sectional isometric view of a portion of the valve actuator shown in FIGS. 1-3 taken along line 4-4 (labeled in FIG. 1) and illustrating the motor-to-screw drive train in greater detail.

FIG. 4 is a cross-sectional view of motor-to-screw drive train 98 taken along line 4-4 (labeled in FIG. 1) illustrating dual stage traction drive 100 in greater detail (peripheral drive gears 104 and 106 are not shown for clarity). In FIG. 4, it can be seen that drive motor 38 is mechanically coupled to the mechanical input of traction drive 100 (i.e., a first sun roller 124) via an elongated rotatable shaft 116, which is supported by ball bearings 118. Rotatable shaft 116 extends through a tubular sleeve 120 disposed between drive motor 38 and central drive gear 102, along a central channel 122 provided through the hub of central drive gear 102, and into traction drive 100 to frictionally engage sun roller 124. A first set of planetary rollers 126 is disposed between first sun roller 124 and a first stationary ring 128, which is fixedly coupled to main housing 24 and remains stationary during operation. Planetary rollers 126 are supported by a first stage carrier 130, which is fixedly coupled to a second sun roller 132. Second sun roller 132 frictionally engages a second set of planetary rollers 134, which frictionally engages the inner circumferential surface of a second stationary ring 136. As indicated in FIG. 3, second stationary ring 136 may be integrally formed with first stationary ring 128. Planetary rollers 134 are supported by a second stage carrier 138. Second stage carrier 138 serves as the mechanical output of traction drive 100 and may be mechanically coupled to central drive gear 102 by way of a splined connector 140. During operation of traction drive 100, drive motor 38 imparts rotational movement to first sun roller 124 via shaft 116. As first sun roller 124 rotates, so too do planetary rollers 126, carrier 130, and second sun roller 132. The rotation of second sun roller 132 drives the rotation of planetary rollers 134 and, therefore, the rotation of carrier 138 and central drive gear 102. The rotation of central drive gear 102 results in the corresponding rotation of peripheral drive gears 104 and 106 (FIG. 3) and, therefore, the rotation of power screws 56 and 58. This, in turn, results in the opposing linear motion of racks 48 and 50 and the rotation of pinion 44 (FIG. 3) as described above.

In the illustrated exemplary embodiment, traction drive 100 is filled with a hydraulic or synthetic fluid, such as oil, and sealed accordingly. Notably, traction drive 100 operates in an extremely quite manner. In addition, traction drive 100 serves as a speed reducer and may have, for example, a 15:1 reduction ratio. Traction drive 100 thus decreases the rotational speed of drive gears 102, 104, and 106. In so doing, traction drive 100 decreases the noise produced by gears 102, 104, and 106 during operation of valve actuator 20. If desired, and as indicated in FIGS. 3 and 4 at 110, drive gears 102, 104, and 106 may also be imparted with a layer of a radially-compliant (e.g., polymeric) material to provide further sound dampening.

Figure 5:
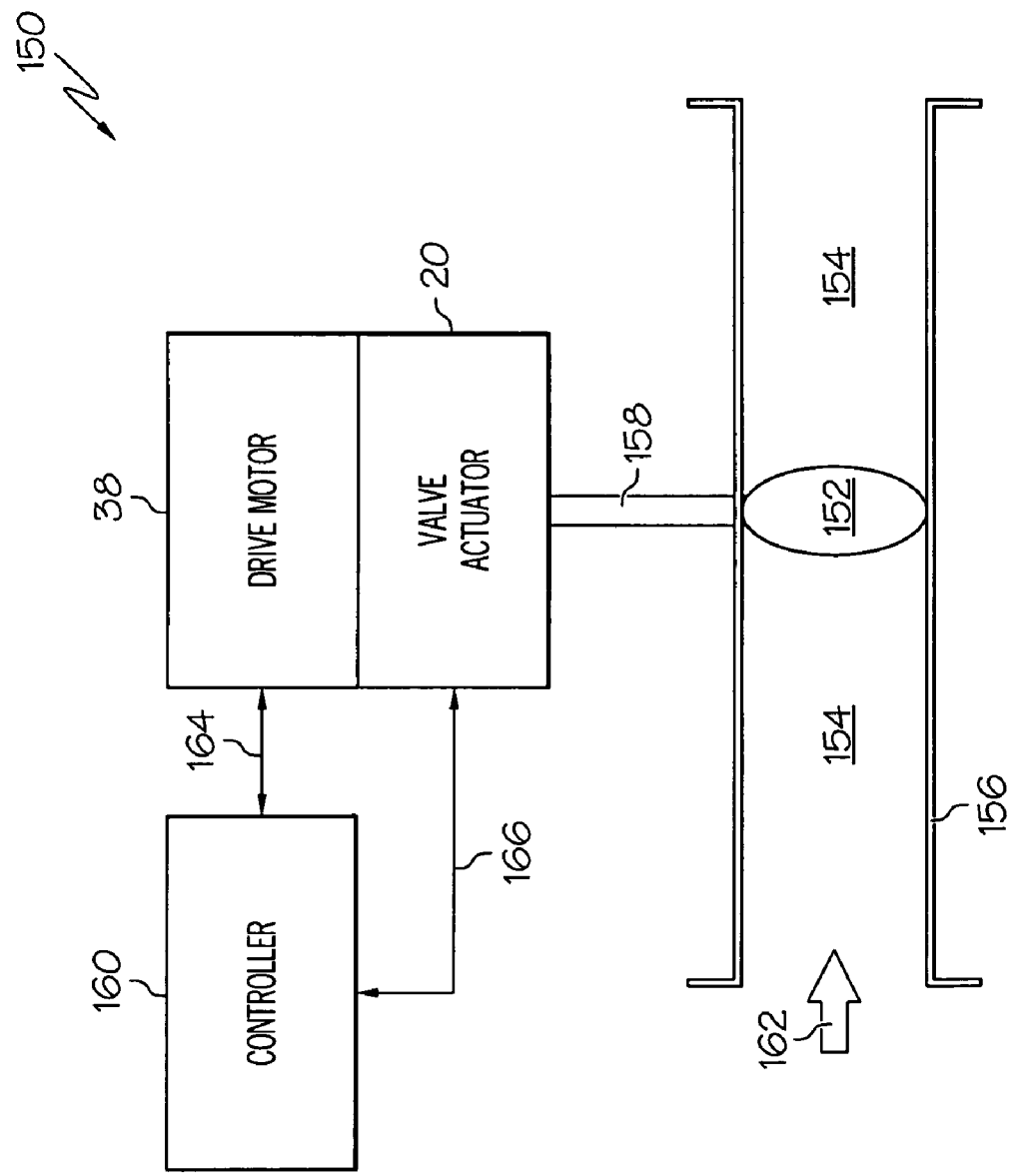
FIG. 5 is a block diagram of an exemplary valve system in which the valve actuator shown in FIGS. 1-4 may be employed.

FIG. 5 is a simplified block diagram of an exemplary valve system 150 in which valve actuator 20 may be deployed. In this case, valve actuator 20 is utilized to adjust the rotational position of a butterfly plate 152 rotatably mounted within a main flow passage 154 provided through a flowbody 156. The mechanical output of valve actuator 20 (e.g., pinion 44 shown in FIG. 3) is mechanically coupled to butterfly plate 152 by way of a rotatable shaft 158; e.g., rotatable shaft 158 may include a splined end that is received within splined opening 46 provided through pinion 44 as shown in FIG. 3. A controller 160 is operatively coupled to drive motor 38. In an embodiment wherein drive motor 38 is an electric motor, controller 160 selectively energizes drive motor 38 to cause valve actuator 20 to rotate shaft 158 and, therefore, butterfly plate 152 to a desired position. In this manner, controller 160 may utilize valve actuator 20 to regulate the flow of pressurized fluid through flow passage 154 (represented in FIG. 5 by arrow 162). If drive motor 38 is a brushless DC motor, drive motor 38 may be equipped with a rotary encoder or other such position sensor that provides controller 160 with a rotor position signal (indicated in FIG. 5 by double-headed arrow 164) that may be utilized for commutation. In addition, and as indicated in FIG. 5 by arrow 166, valve actuator 20 may also be equipped with a position sensor that provides controller 160 with a signal indicative of the rotational position and/or the rotational rate of pinion 44 (FIG. 3). A non-exhaustive list of suitable position sensors includes various encoders, potentiometers, resolvers, monopoles, and so on. As a specific example, and with reference to FIGS. 1 and 2, an optical encoder 170 may be disposed within main housing 24 adjacent pinion 44 (indicated in FIGS. 1 and 2 at 170) and configured to monitor the rotational rate and/or the angular position of pinion 44 in the well-known manner.

Considering the above, it should be appreciated that there has been provided at least one exemplary embodiment of a low profile valve actuator that provides a relatively high torque output. Notably, such a valve actuator is mechanically balanced to minimize stress placed on individual components and thereby maximize operational life of the valve actuator. In certain embodiments, the valve actuator employs an electric drive motor and thus does not require the plumbing associated with conventional high power hydraulic actuators. In further embodiments, the low profile valve actuator operates in an exceptionally quiet and reliable manner and is consequently well-suited for deployment aboard a submarine.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. An actuator for use in conjunction with an electric drive motor, the actuator comprising:
   a housing assembly;
   a first rack translatably mounted in the housing assembly and having a first longitudinal channel therethrough;
   a second rack translatably mounted in the housing assembly and having a second longitudinal channel therethrough;
   a first power screw rotatably mounted in the housing assembly, extending through the first longitudinal channel, and threadably coupled to the first rack;
   a second power screw rotatably mounted in the housing assembly, extending through the second longitudinal channel, and threadably coupled to the second rack;
   a pinion rotatably disposed within the housing assembly between the first rack and the second rack, the pinion configured to rotate as the first and second racks move linearly within the housing assembly; and
   a motor-to-screw drive train configured to be coupled to the electric drive motor and, when driven thereby, to cause rotation of the first and second power screws and linear movement of the first and second racks, the motor-to-screw drain train comprising:
      a planetary drive mechanically coupled to the first and second power screws and mounted within the housing assembly adjacent the first and second power screws;
      first and second peripheral drive gears mechanically coupled to the first and second power screws, respectively; and
      a central drive gear mechanically coupled to the planetary drive and disposed between the first and second peripheral drive gears.

2. A valve actuator according to claim 1 further comprising a nut mounted in the first longitudinal channel and threadably coupled to the first power screw.

3. A valve actuator according to claim 1 wherein the pinion is mounted within a central portion of the housing assembly.

4. A valve actuator according to claim 1 wherein the second rack engages the pinion substantially opposite the first rack.

5. A valve actuator according to claim 1 wherein the first power screw and the second power screw have substantially opposing threads, and wherein the motor-to-screw drive train is configured such that the first power screw and the second power screw rotate in the same rotational direction.

6. A valve actuator according to claim 1 wherein the motor-to-screw drive train comprises a traction drive mechanically coupled between the drive motor, the first power screw, and the second power screw.

7. An actuator according to claim 1 wherein the motor-to-screw drive train further comprises an elongated shaft extending through the central drive gear to rotatably couple the planetary drive to the electric drive motor.

8. An actuator according to claim 1 further comprising first and second bearings supporting opposing ends of the first power screw, the first and second bearings received within opposing opening ends of the first longitudinal channel as first rack is moved between different linear positions within the housing assembly.

9. A valve actuator according to claim 1 wherein the housing assembly has an elongated cavity formed therein, the first rack slidably disposed within the elongated cavity.

10. A valve actuator according to claim 9 wherein the first power screw is rotatably mounted within the elongated cavity.

11. A valve actuator according to claim 1 wherein the longitudinal axes of the first power screw and the second power screw are substantially parallel.

12. A valve actuator according to claim 11 wherein the rotational axis of the pinion is substantially perpendicular to the longitudinal axes of the first power screw and the second power screw.

13. An actuator for use in conjunction with an electric drive motor, the actuator comprising:
   a housing assembly;
   a first rack translatably mounted in the housing assembly and having a first longitudinal channel therethrough;
   a second rack translatably mounted in the housing assembly and having a second longitudinal channel therethrough;
   a first power screw rotatably mounted in the housing assembly, extending through the first longitudinal channel, and threadably coupled to the first rack;
   a second power screw rotatably mounted in the housing assembly, extending through the second longitudinal channel, and threadably coupled to the second rack;
   a pinion rotatably disposed within the housing assembly between the first rack and the second rack, the pinion configured to rotate as the first and second racks move linearly within the housing assembly;
   a motor-to-screw drive train including a planetary drive mechanically coupled to the first and second power screws and mounted within the housing assembly adjacent the first and second power screws, the motor-to-screw drive train configured to be coupled to the electric drive motor and, when driven thereby, to cause rotation of the first and second power screws and linear movement of the first and second racks;
   a nut rotatably coupled to the first power screw and fixedly coupled to an internal surface of the first rack; and
   first and second adjustment collars disposed within the first rack and threadably coupled to opposing ends of the nut, the first and second adjustment collars permitting the linear position of the nut to be adjusted within the first rack.

* * * * *